US012382866B2

(12) United States Patent
De Angelis

(10) Patent No.: US 12,382,866 B2
(45) Date of Patent: Aug. 12, 2025

(54) FRONT-LOAD DECK FOR A STAND-ON MOWER

(71) Applicant: Vincent De Angelis, Wayne, IL (US)

(72) Inventor: Vincent De Angelis, Wayne, IL (US)

( * ) Notice: Subject to any disclaimer, the term of this patent is extended or adjusted under 35 U.S.C. 154(b) by 999 days.

(21) Appl. No.: 17/358,053

(22) Filed: Jun. 25, 2021

(65) Prior Publication Data
US 2022/0386529 A1 Dec. 8, 2022

Related U.S. Application Data

(60) Provisional application No. 63/197,523, filed on Jun. 7, 2021.

(51) Int. Cl.
*A01D 34/00* (2006.01)
*A01D 34/64* (2006.01)
*A01D 42/00* (2006.01)
*A01D 101/00* (2006.01)

(52) U.S. Cl.
CPC ............ *A01D 42/00* (2013.01); *A01D 34/64* (2013.01); *A01D 2101/00* (2013.01)

(58) Field of Classification Search
CPC ...... A01D 34/64; A01D 34/82; A01D 34/001; A01D 42/00; A01D 42/06; A01D 42/08; A01D 43/00; A01D 43/063; A01D 43/086; A01D 67/04; A01D 2101/00; B62D 27/04; B60N 2/24; B60N 2/502; B60B 33/0049; B60B 33/0039; B60B 33/0068; B60B 33/0073
See application file for complete search history.

(56) References Cited

U.S. PATENT DOCUMENTS

| | | | | |
|---|---|---|---|---|
| 4,878,339 A | * | 11/1989 | Marier | A01D 34/64 180/209 |
| 7,089,722 B2 | * | 8/2006 | Laskowski | A01D 34/662 56/14.9 |
| 7,448,691 B2 | * | 11/2008 | Brooks | B60B 33/0049 298/3 |
| 9,809,263 B2 | * | 11/2017 | Mitchell | B62D 51/001 |
| 2009/0272088 A1 | * | 11/2009 | Losey | A01D 34/001 56/14.7 |
| 2021/0127577 A1 | * | 5/2021 | Weihl | A01D 34/66 |
| 2022/0379781 A1 | * | 12/2022 | Kucera | B62D 51/02 |

OTHER PUBLICATIONS

Website version before and proximal to Jun. 7, 2021—Swisher Versa mower: https://www.swisherinc.com/versa-389cc-30-rough-cut-tractor-vtrc30.html.

(Continued)

*Primary Examiner* — Joseph M Rocca
*Assistant Examiner* — Robert E Pezzuto
(74) *Attorney, Agent, or Firm* — McClure, Qualey & Rodack, LLP

(57) ABSTRACT

In one embodiment, a stand-on mower, comprising a chassis having drive wheels operably coupled to the chassis, a platform arranged between the drive wheels, a front wheel frame, coupled to the chassis, and having pivot mounts and front wheels coupled to the pivot mounts, and a load deck mounted to the front wheel frame and having openings through which the pivot mounts extend.

12 Claims, 14 Drawing Sheets

(56) References Cited

OTHER PUBLICATIONS

Website version before and proximal to Jun. 7, 2021—Toro Model 74518 mower: https://www.toro.com/en/professional-contractor/commercial-mowers/grandstand-stand-on-mower-74518.

Website version before and proximal to Jun. 7, 2021—Scag V-Ride II mower: https://www.scag.com/product/stand-on-mowers/v-ride-ii/.

Website version before and proximal to Jun. 7, 2021—48" Gravely Pro-stance mower: https://www.gravely.com/en-us/power-equipment/stand-on-mowers/pro-stance.

Website version before and proximal to Jun. 7, 2021—Encore stand-on mower: https://encoreequipment.com/mowers/rage/.

Website version before and proximal to Jun. 7, 2021—Velke stand-on mower: https://web.archive.org/web/20210406191053/https://www.wrightmfg.com/.

Website version before and proximal to Jun. 7, 2021—Ferris stand-on mower: https://www.ferrismowers.com/na/en_us/products/stand-on-mowers.html.

\* cited by examiner

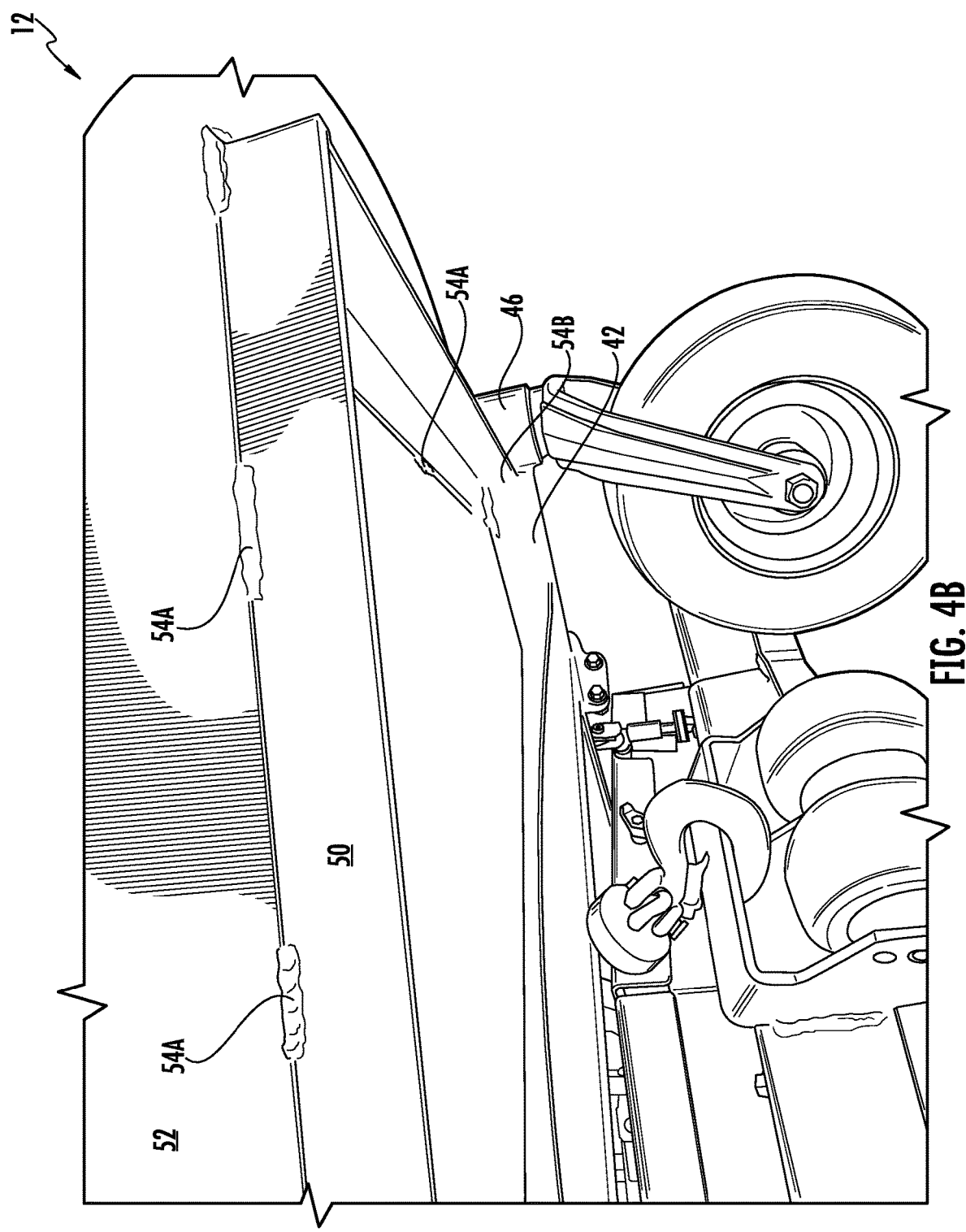

FRONT-LOAD DECK FOR A STAND-ON MOWER

CROSS REFERENCE TO RELATED APPLICATION

This application claims the benefit of U.S. Provisional Application No. 63/197,523, filed Jun. 7, 2021, which is hereby incorporated by reference in its entirety.

TECHNICAL FIELD

The present disclosure is generally related to stand-on mowers.

BACKGROUND

Lawn mowers are generally categorized as walk-behind, seated-riding, and stand-on mowers. Each type has their own perceived advantages and disadvantages, the choice of which depends on whether the use is through a commercial organization (e.g., lawn care business) or residential owner (e.g., private homeowner), cost constraints, and/or the frequency and/or type of application for which the mower is intended to be used. Stand-on mowers generally have a platform located between a pair of rear drive wheels that enables the operator to stand while operating the mower. Such mowers are often used by commercial organizations, though not limited as such, and may be chosen for any one or more of a variety of reasons. For instance, some perceived benefits of stand-on mowers (e.g., versus seated-riding) include ergonomics (e.g., reduced back strain, which is also a motivation for recent trends in standing desktops in office environments, and easier to mount), tighter operational and storage specifications (e.g., shorter length than seated riding mowers of the same cutting width permits improved maneuverability, and permits more machines to be loaded onto a trailer), and safety (e.g., easy to dismount in dangerous situations). With one or more of these perceived benefits, stand-on mowers have gained in popularity, yet design improvements are still needed to provide more versatility to these machines.

SUMMARY OF THE INVENTION

In one embodiment, a stand-on mower, comprising a chassis having drive wheels operably coupled to the chassis, a platform arranged between the drive wheels, a front wheel frame, coupled to the chassis, and having pivot mounts and front wheels coupled to the pivot mounts, and a load deck mounted to the front wheel frame and having openings through which the pivot mounts extend.

These and other aspects of the invention will be apparent from and elucidated with reference to the embodiment(s) described hereinafter.

BRIEF DESCRIPTION OF THE DRAWINGS

Many aspects of a load deck for a stand-on mower of the present disclosure can be better understood with reference to the following drawings. The components in the drawings are not necessarily to scale, emphasis instead being placed upon clearly illustrating the principles of a load deck for a stand-on mower. Moreover, in the drawings, like reference numerals designate corresponding parts throughout the several views.

FIGS. 4A-4G are schematic diagrams that illustrate, in various views, example support members coupled to a lower surface of an embodiment of an example load deck and an example securement method among a front wheel frame, the support members, and the load deck.

DESCRIPTION OF EXAMPLE EMBODIMENTS

Figure 1A:
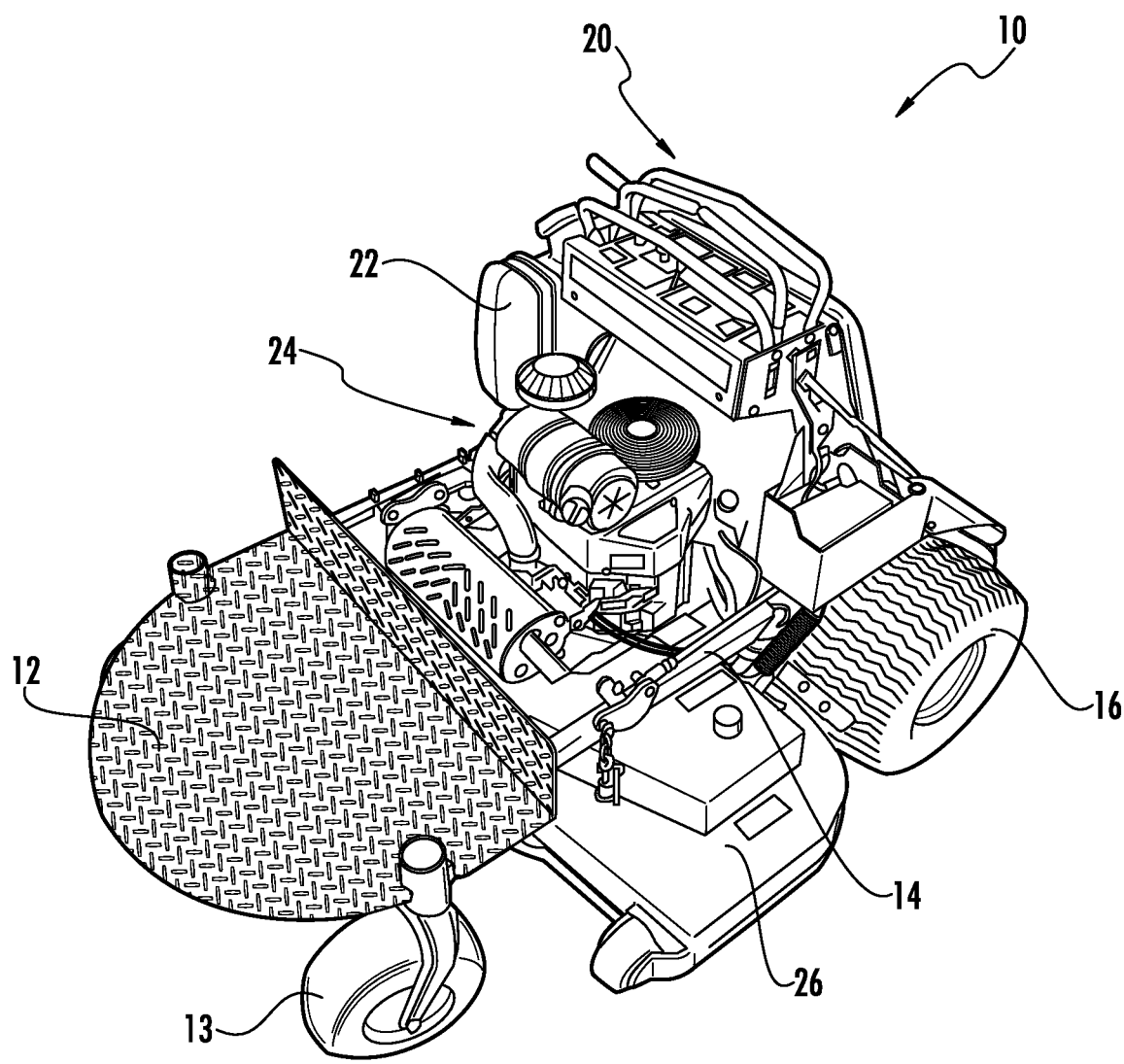
FIGS. 1A-1B are schematic diagrams that illustrate, in front and rear isometric views, an embodiment of an example stand-on mower equipped with an embodiment of an example load deck.

Certain embodiments of a load deck and corresponding stand-on mower on which the load deck is mounted are disclosed that provide for added utility or versatility to the normal mowing function of such machines. In one embodiment, the load deck is mounted to a front wheel frame and is a solid metal structure to carry loads that may be used for any lawn care or landscaping maintenance. For instance, the load deck may be used instead of a wheel barrel, landscaping dolly, or any type of push cart, and can be loaded with, for instance, a fifty-five (55) gallon or larger plastic container of mulch, landscape stone, sand, dirt, gravel, landscaping tools, among other material that is needed to facilitates lawn care/landscaping maintenance. The use of a load deck is beneficial for transporting a new installation or removal of existing landscaping to negate the need for other machines or equipment to carry such loads, such as trees, sod, shrubs, plants, paver bricks, large retaining wall blocks, garbage cans, branches, tree logs, rolls of landscaping straw, rolls of weedscreen, heavy landscape urns, and/or bags of fertilizer, which may lead to reduced cost and/or labor in the servicing of lawns and landscaping efficient operations.

Digressing briefly, existing stand-on mowers lack a load deck, requiring the need for physically carrying bags, containers, and/or material or using an additional machine to carry such loads to the work site. In contrast, certain embodiments of a stand-on mower and load deck are disclosed, the installation of the load deck made possible through the efficient utilization of at least existing space on typical stand-on mowers by mounting (and securing) a load deck onto the front wheel frame, the load deck having sufficient structure to support the expected heavier loads often associated with landscape maintenance and related projects.

Having summarized various features of certain embodiments of a stand-on mower with load deck of the present disclosure, reference will now be made in detail to the detailed description of a stand-on mower with load deck as illustrated in the drawings. While the disclosure is described in connection with these drawings, there is no intent to limit it to the embodiment or embodiments disclosed herein. For instance, though emphasis is placed on examples illustrating one type of model and manufacturer of a stand-on mower, it should be appreciated that the load deck may be arranged on other types of stand-on mowers, with perhaps some minor adjustments in dimensions and/or manner of securement for some model types to accommodate any variations in specifications, with these minor variations contemplated to be within the scope of the invention. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the scope of a stand-on mower with load deck as defined by the appended claims. Further, it should be appreciated in the context of the present disclosure that the claims are not necessarily limited to the particular embodiments set out in the description.

Figure 1B:
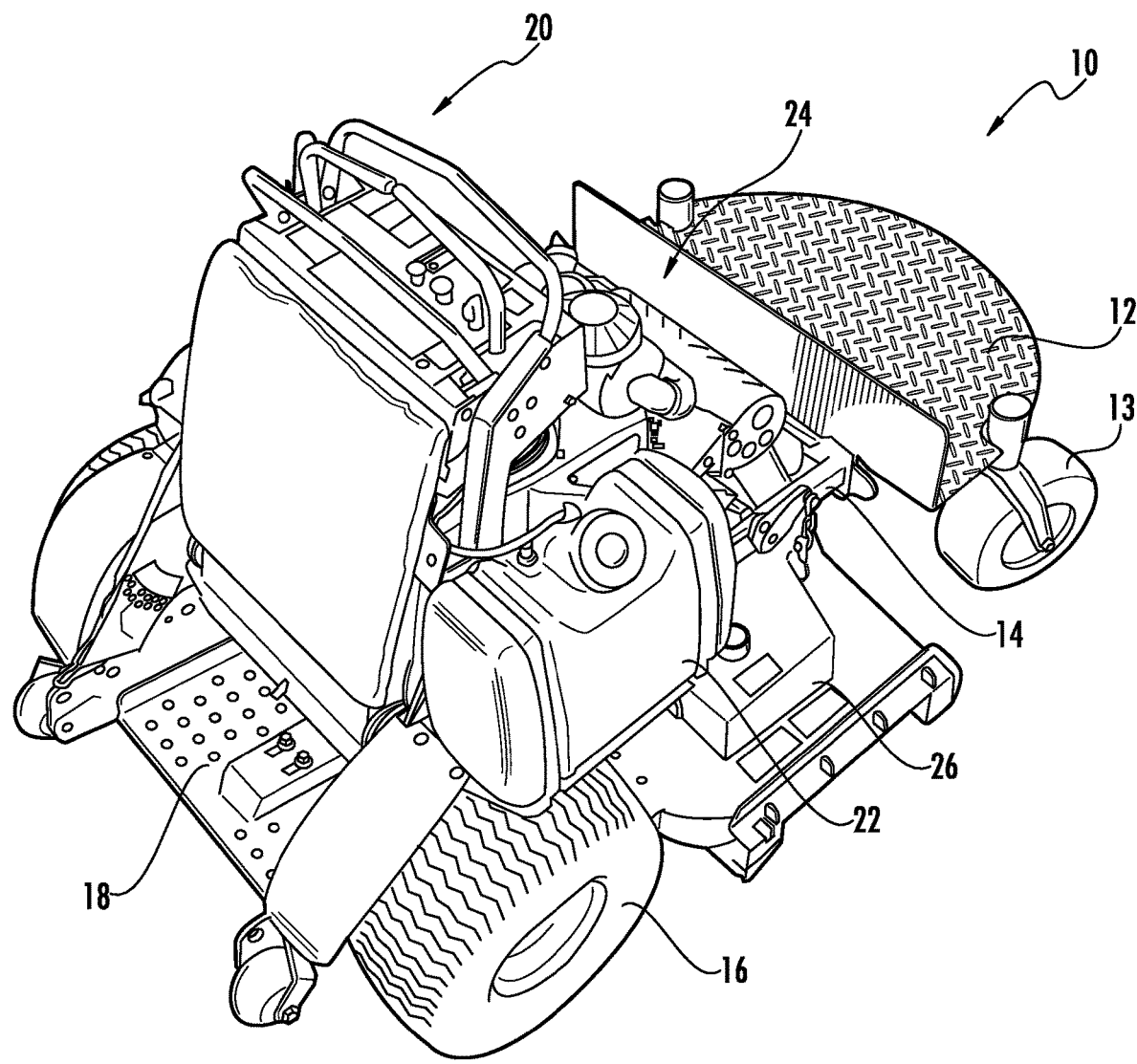

FIGS. 1A-1B are schematic diagrams that illustrate, in front and rear isometric views, an embodiment of an example stand-on mower 10 equipped with an embodiment of an example load deck 12. It should be appreciated by one having ordinary skill in the art that the example stand-on mower 10 illustrates one example stand-on mower using a particular manufacturer and model, and that in some embodiments, stand-on mowers of other manufacturers and/or model types may also be equipped in a similar arrangement with the example load deck 12 and hence are contemplated to be within the scope of the invention. The stand-on mower 10 comprises conventional components, including a chassis or frame 14 comprising plural (e.g., a pair) of rear drive wheels 16 operably coupled to the chassis 14, and a platform 18 arranged between the rear drive wheels 16. The platform 18 is arranged centrally and at the rear of the stand-on mower 10, enabling an operator to control the movement of the stand-on mower 10 through manipulation of the mower controls 20. Also mounted to the chassis 14 is a fuel reservoir 22, engine 24, and a mower (or cutter) deck 26. Engine and motor deck operation are controlled by the operator using the mower controls 20, as is known. For instance, an operator may raise and lower the mower deck 26 using the mower controls 20. The stand-on mower 10 further comprises the load deck 12 at the front of the stand-on mower 10, which is mounted to pivot mount assemblies to which the front wheels 13 are coupled. Note that the load deck 12 is used in addition to the mower deck 26, and is not a decorative panel or covering from other components of the stand-on mower 10, but rather, a load-bearing structure (e.g., carrying loads of approximately five hundred (500) pounds or more). As explained below in association with FIGS. 3A-3B, the load deck 12 is mounted to a front wheel frame, and is used to transport tools, equipment, and/or material to a work location. For instance, an operator may place tools, bags of stone or containers of fertilizer or weed killer, etc., on the load deck 12 for transport to a desired work-site location.

Figure 2A:
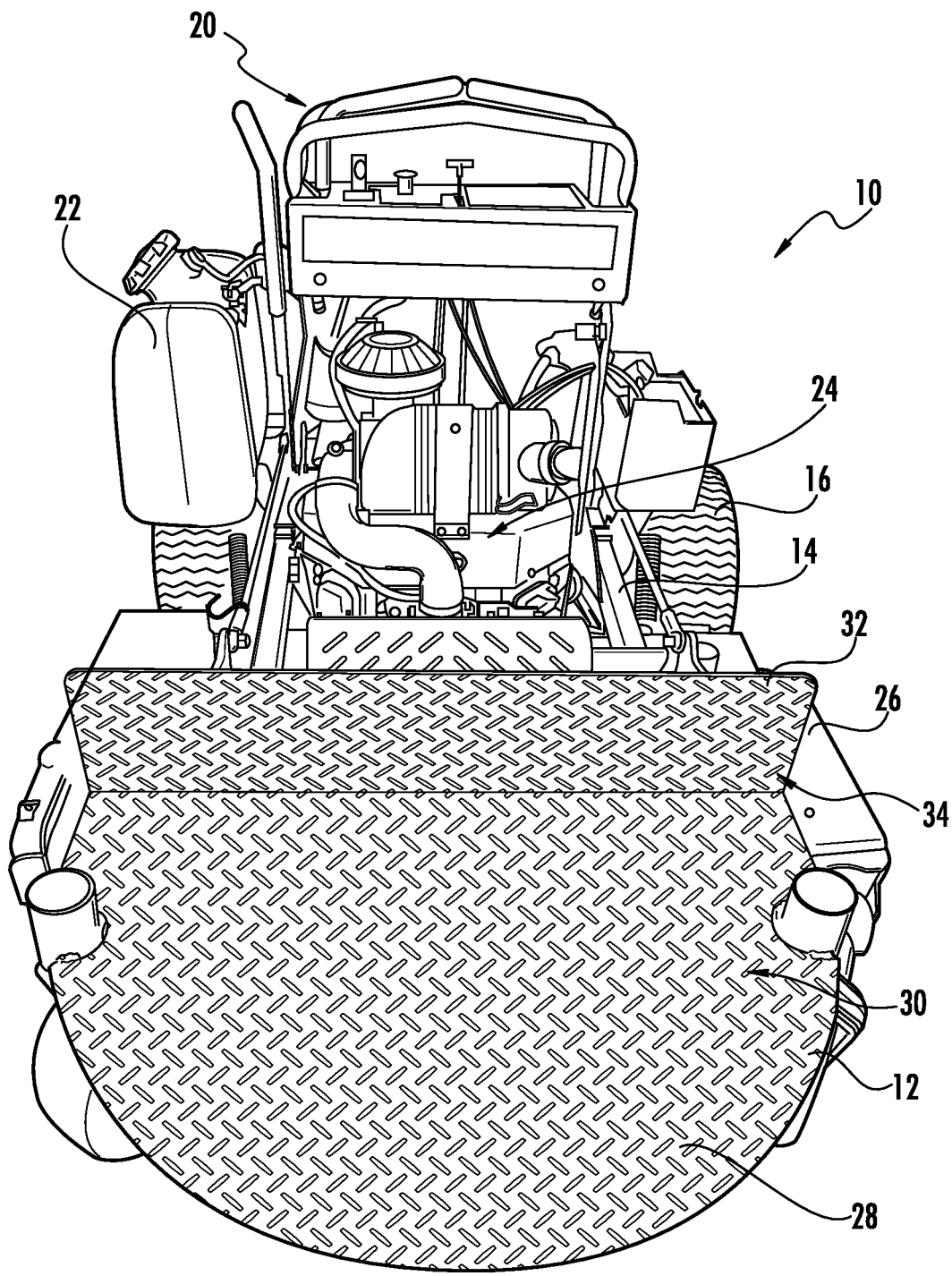
FIGS. 2A-2B are schematic diagrams that illustrate, in front and side isometric views, an embodiment of an example load deck used on an example stand-on mower.
Figure 2B:
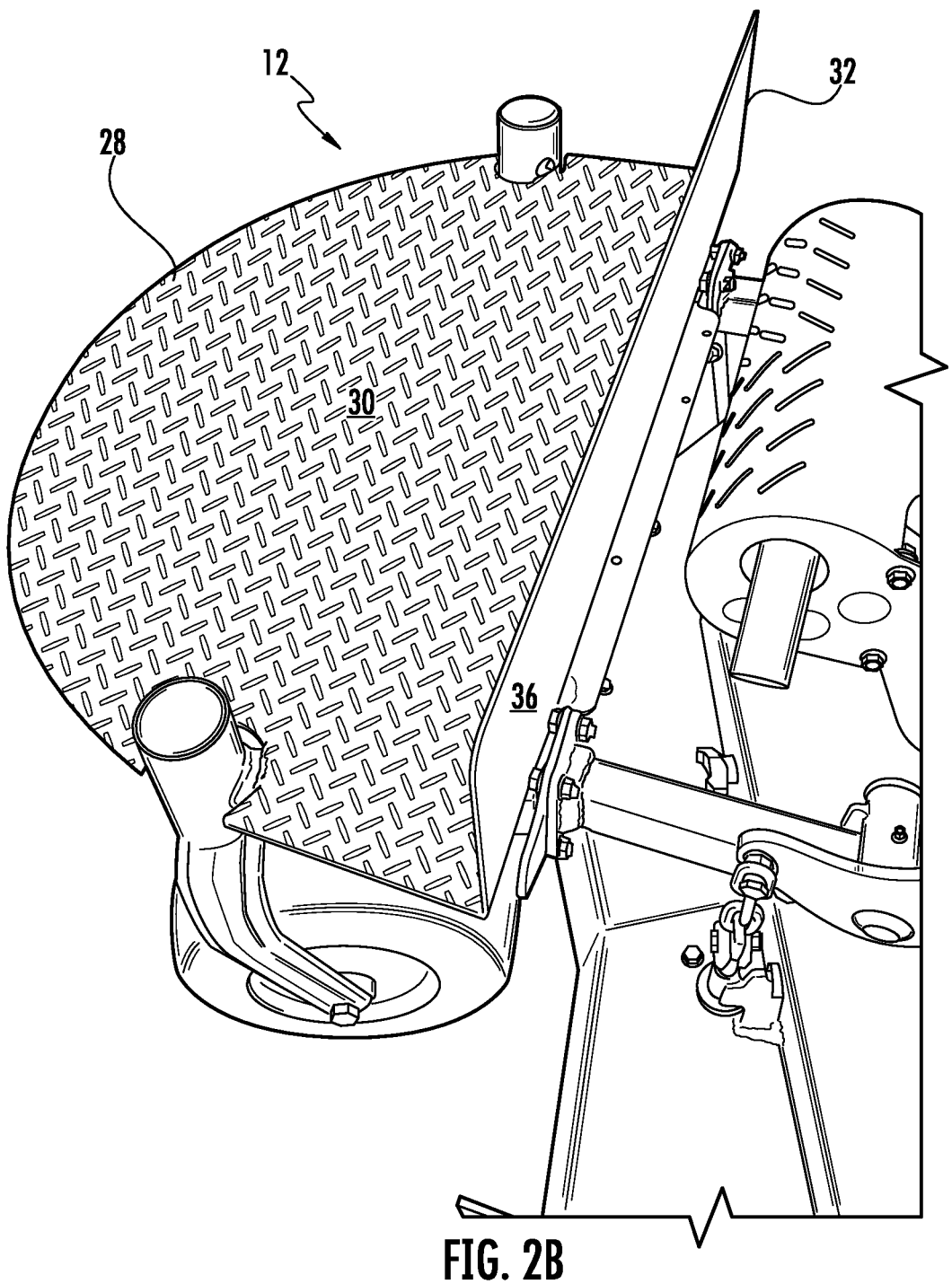
Figure 4A:
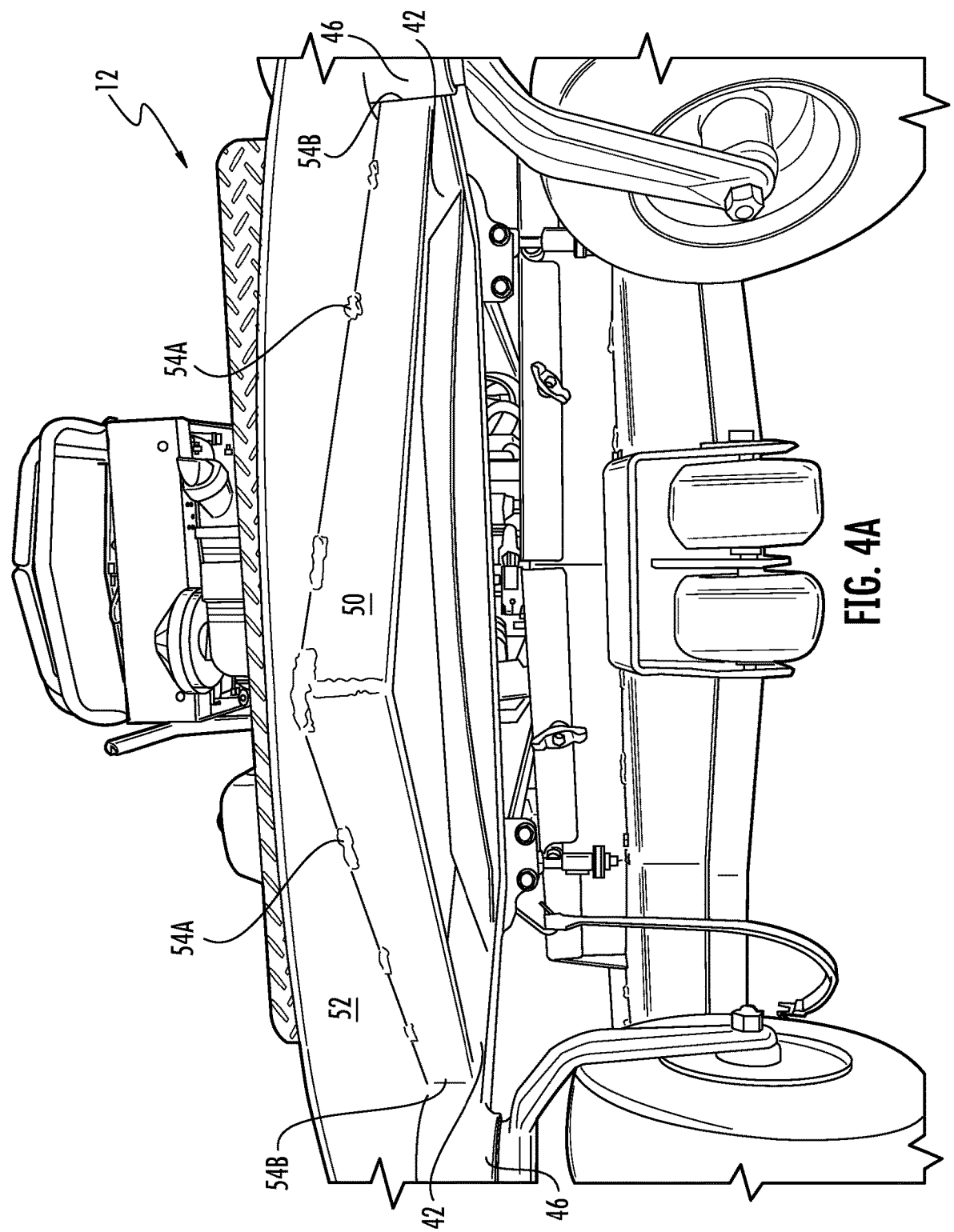
Figure 4C:
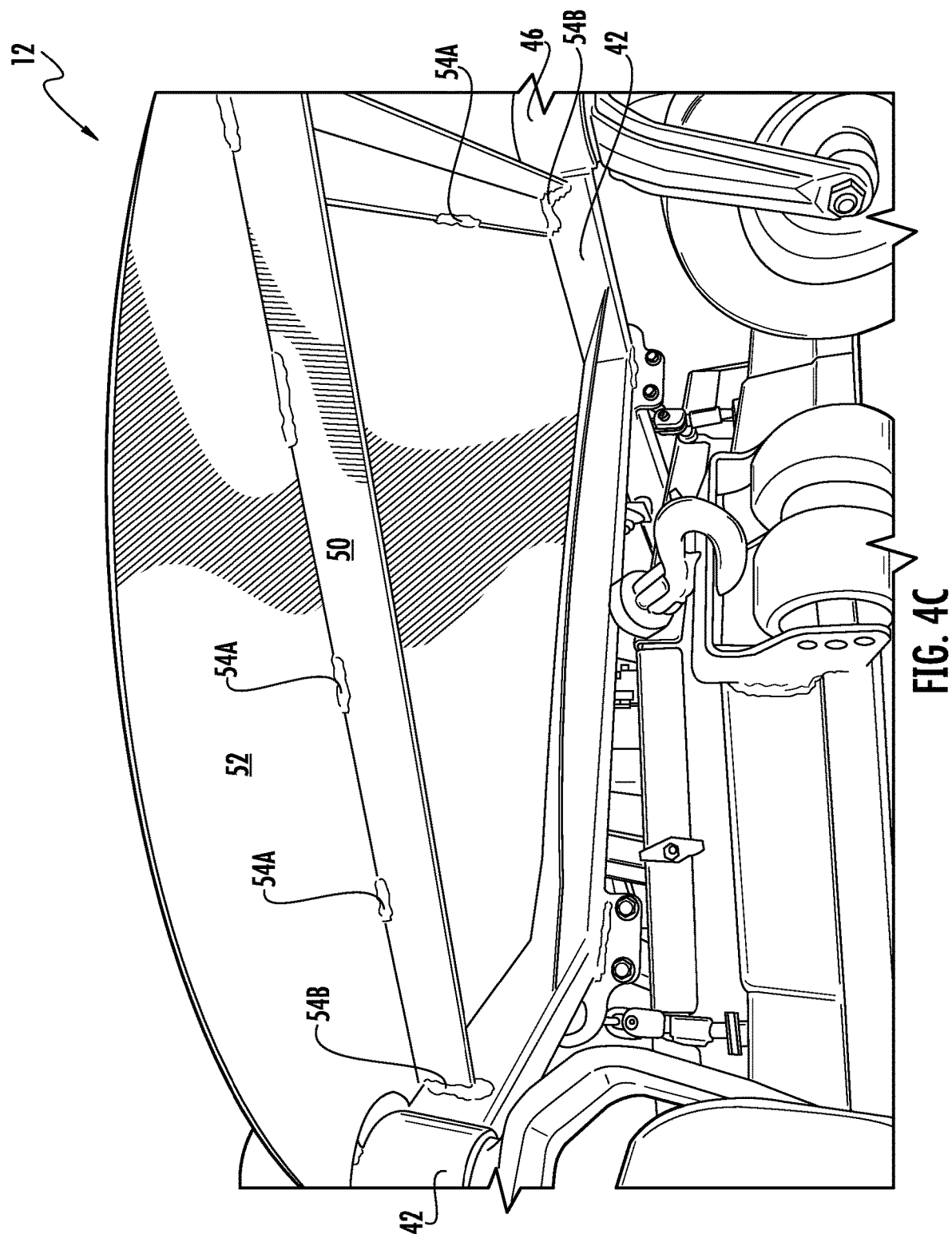
Figure 4D:
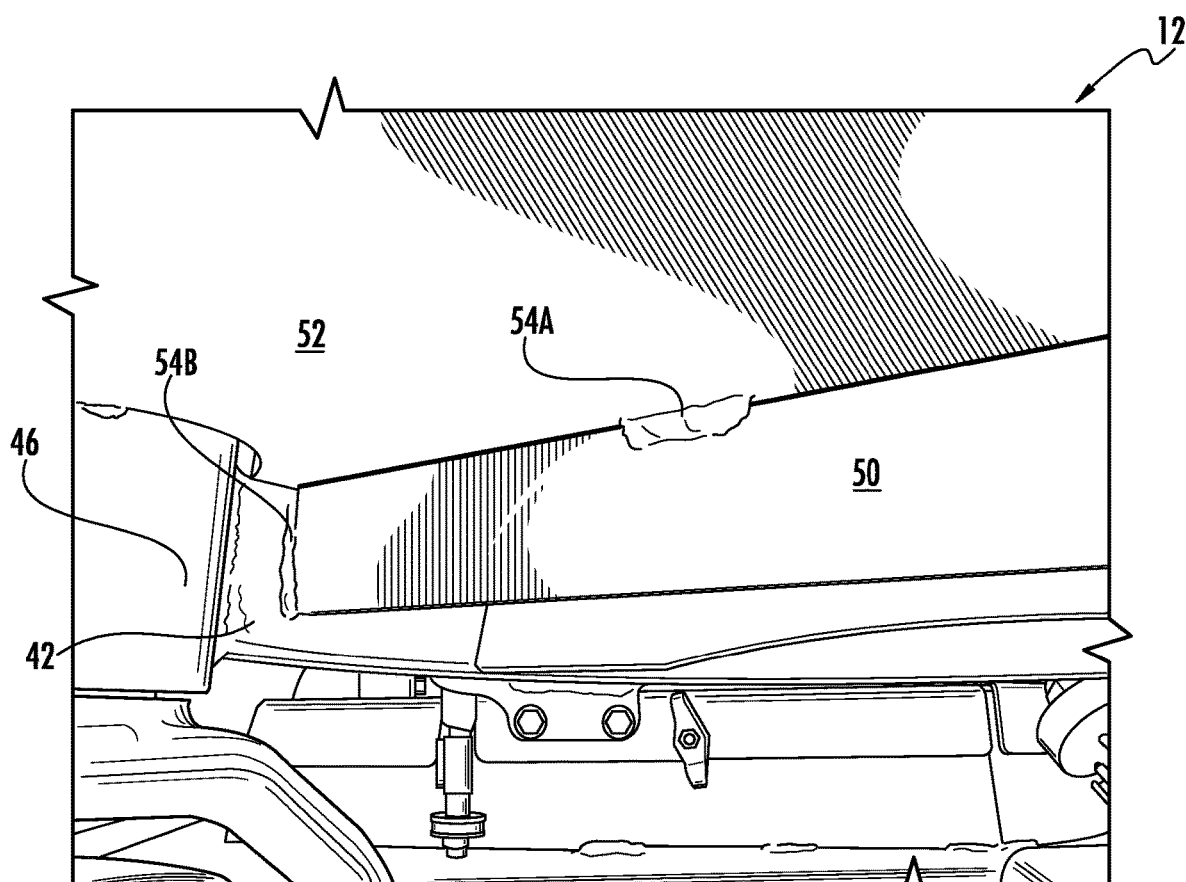

Referring to FIGS. 2A-2B, shown are front and side isometric views of one embodiment of the load deck 12. In some embodiments, the load deck 12 may take on a different geometric configuration and/or structure. Note that discussion of like-numbered structures for the same structures shown in FIGS. 1A-1B (and other figures described herein) is omitted here for brevity, with emphasis hereinafter on the load deck 12. The load deck 12 is shown with a first portion 28 comprising an upper surface 30 (e.g., upper-facing) and lower surface (ground-facing, as shown in FIG. 4A). In one embodiment, the load deck 12 comprises a second portion 32 that joins (e.g., is coupled to, including integrated) with the first portion 28. In one embodiment, the second portion 32 is upright (e.g., orthogonal to the first portion 28). In some embodiments, the second portion 32 is substantially orthogonal (e.g., within approximately ±0.1-10 degrees from the upright position). In one embodiment, the second portion 32 is formed by bending one end (opposite the apex end) of the load deck upward. In some embodiments, a separate piece of material (e.g., of metal or other material) used as the second portion 32 may be welded or more generally, secured, to the first portion 28. In some embodiments, the first portion 28 and second portion 32 may be cast or forged as a unitary piece in the L-shaped configuration as shown in FIGS. 2A-2B. In some instances, the second portion 32 may function to prevent tipping during transport. In some embodiments, the second portion 32 may be omitted. In one embodiment, the upper surface of the first portion 28 may comprise a stippled surface (e.g., rough surface). For instance, the stipples (e.g., protrusions) may provide a friction surface to reduce the risk of loads on the load deck 12 from sliding off or sliding off-center of the load deck 12 (e.g., to prevent causing an imbalance). The stipples may be arranged according to a regular pattern, as shown in FIGS. 2A-2B, or arranged as an irregular pattern. In some embodiments, the stipples may be located in only a sub-portion of the upper surface 30 of the load deck 12, or in some embodiments, may be omitted. In some embodiments, dimples may be used additionally or as an alternative to stipples.

The second portion 32 comprises a forward-facing surface 34 and a rearward-facing surface 36. The use or omission of stipples in all or a portion of the forward-facing surface 34 is as similarly described for the upper surface 30 of the first portion 28, and hence omitted here for brevity. The lower surface of the first portion 28 and the rearward-facing surface 36 may be comprised of a smooth surface, though in some embodiments, stipples (and/or dimples) may be arranged or omitted as described above for upper surface 30 and forward-facing surface 34 may likewise be used similarly for the lower surface of the first portion 28 or the rearward-facing surface 36.

In one embodiment, the load deck 12 is comprised of a metal material (e.g., steel). In one embodiment, the load deck 12 is approximately $1/16^{th}$ inch thickness, but other thicknesses may be used depending on the intended loads to be carried. In some embodiments, other material may be used for the load deck 12, or portions of the load deck 12. For instance, the second portion 32 may be comprised of a non-metal material with sufficiently high strength and durability for carrying loads.

Figure 3A:
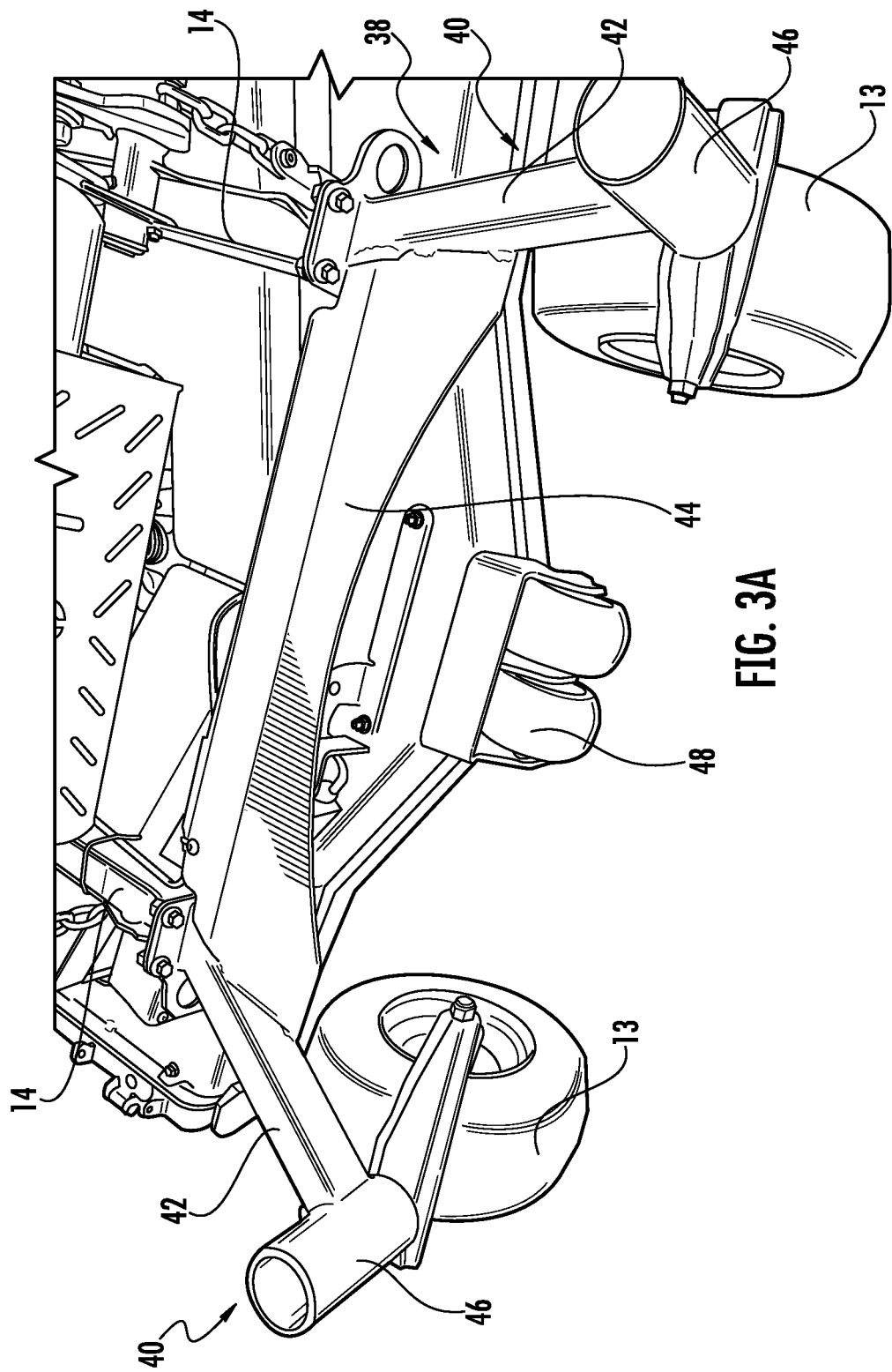
FIGS. 3A-3B are schematic diagrams that illustrate, in front isometric and elevation views, an example front wheel frame, upon which an embodiment of a load deck may be mounted.
Figure 3B:
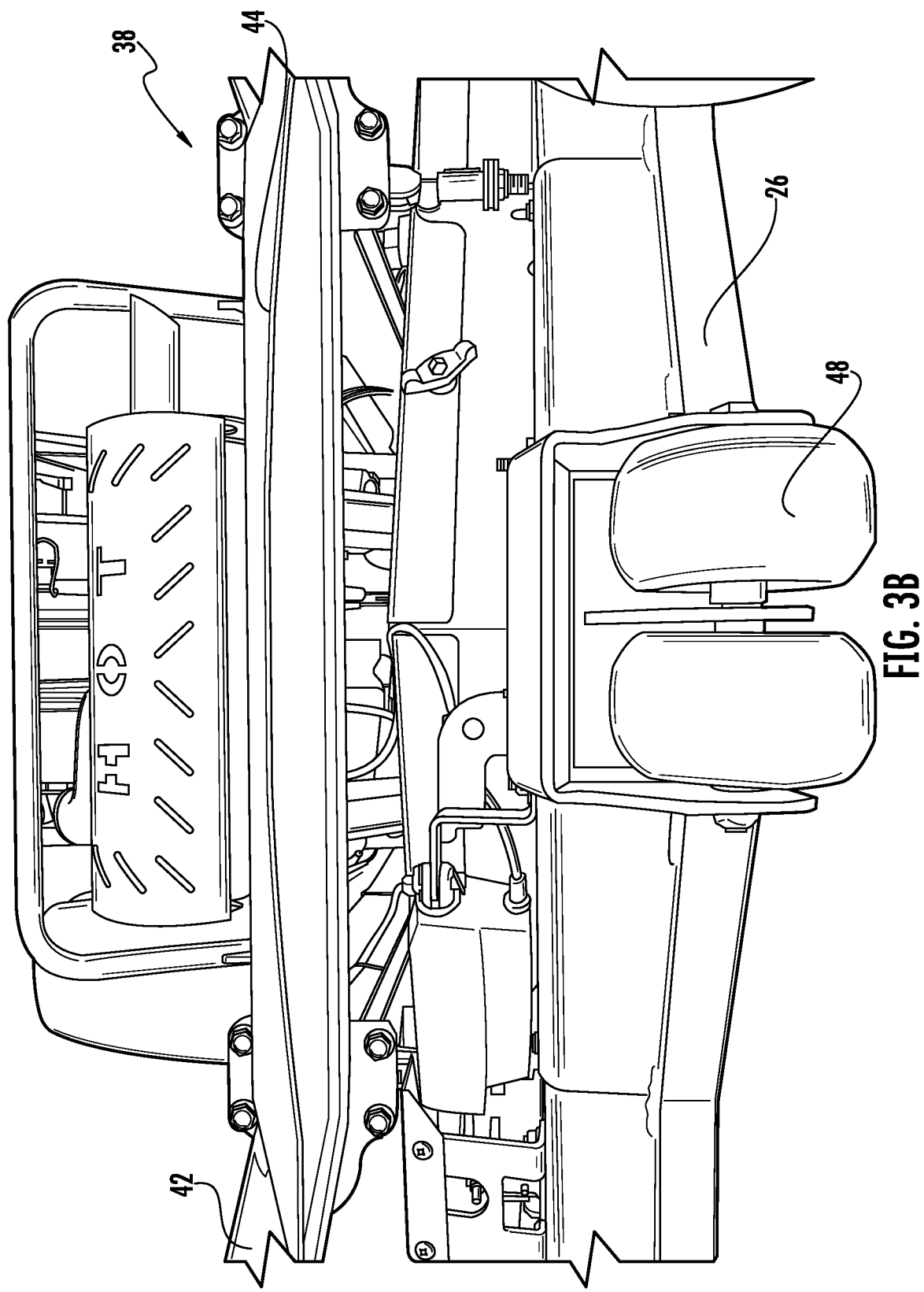

Before explaining further the structure and manner of mounting the load deck according to various embodiments, attention is directed to FIGS. 3A-3B to show an example front wheel frame 38 coupled to the chassis 14 and to which the load deck 12 is mounted. For instance, FIGS. 3A-3B reveal the front wheel frame 38 before the load deck 12 is mounted to the front wheel frame 38. As shown, the front wheel frame 38 comprises a pair of pivot mount assemblies 40 with forwardly extending frame members 42 and a laterally-oriented frame member 44 arranged between and secured (e.g., welded) to the forwardly extending frame members 42. One end of each of the forwardly extending frame members 42 is coupled to the chassis 14. For instance, the coupling shown in FIGS. 3A and 3B are bolted flanged assemblies of the chassis 14 and the forwardly extending frame members 42, though other mechanisms of securement may be used in some embodiments. At the other end of each of the forwardly extending frame members 42 are respective pivot mounts 46 that are each coupled to the front wheels 13. Note that the forwardly extending frame members 42 are shown as slightly angled fore-and-aft relative to a longitudinal centerline of the stand-on mower 10, though in some embodiments, the members 42 may be parallel to the centerline or at a different angle relative to the longitudinal centerline than shown. The front wheels 13 comprise caster wheels, as is typical of stand-on mowers, though other types of front wheel and steering mechanisms may be used in some embodiments. Also shown are mower deck wheels 48 of the mower deck 26, though discussion of the same is omitted here for clarity and to avoid obfuscating relevant features of the invention. As is discussed further below, the load deck 12 is mounted to the front wheel frame 38, with securement (e.g., welding) of the load deck 12 to the laterally-oriented frame member 44, the forwardly extending frame members 42, and the pivot mounts 46.

Attention is now directed to FIGS. 4A-4G, which illustrate example support members 50 coupled to a lower surface 52 of the load deck 12, and which further illustrate an example method of securement (e.g., welds) among the front wheel frame 38, the support members 50, and the load deck 12. Note that in some embodiments, fewer or additional support member 50 may be used. Though the support members 50 are shown arranged in a triangular-shaped arrangement (with the apex at or adjacent to the apex of the rounded end of the load deck 12), in some embodiments, the manner of arrangement of the support members 50 may be different than the triangular configuration shown. In some embodiments, the support members 50 may be omitted, depending on the intended application, budgetary constraints, carrying capacity, and/or thickness of the load deck 12, among other factors. For instance, the load deck 12 may be thicker (e.g., greater than $1/16^{th}$ inch) and/or the anticipated loads may be of less weight than, say, approximately five-hundred (500) pound rating intended for the present design. The support members 50 help prevent or mitigate deformation of the load deck 12 under load and/or loads over time (e.g., the expected life of the stand-on mower 10). Note that some reference lines and numbers for other features of the stand-on mower 10, previously described and depicted, are omitted here to avoid obfuscating relevant features. With particular focus on FIGS. 4A-4D, the support members 50 are depicted as L-shaped, metal (e.g., iron) support beams coupled to the lower surface 52 of the load deck 12 and arranged at a point or apex centrally adjacent the rounded, forward-most end of the load deck 12 and extended rearwardly from the apex to each of the forwardly extending frame members 42 at locations that are adjacent to, and rearward of, each of the pivot mounts 46. In some embodiments, the support members 50 may be embodied according to a different form (e.g., square tubes, rounded supports, etc.). In one embodiment, the support members 50 are welded to the lower surface 52 of the load deck 12 at plural, spaced-apart locations as represented in a few locations by welds 54A. The (e.g., upright) ends of the support members 50 adjacent the respective pivot mounts 46 are welded to the forwardly extending frame members 42, as shown illustratively by welds 54B. Note that additional or fewer locations for the welds 54 may be used in some embodiments, and/or in some embodiments, the coverage area of each of the welds 54 may be less or greater. In some embodiments, the location where the ends of the support members 50 are secured (e.g., welded) to the forwardly extending frame members 42 may be different. Note that other and/or additional mechanisms/methods of securement may be used, including for instance, through the use of bolts, screws, etc.

Figure 4E:
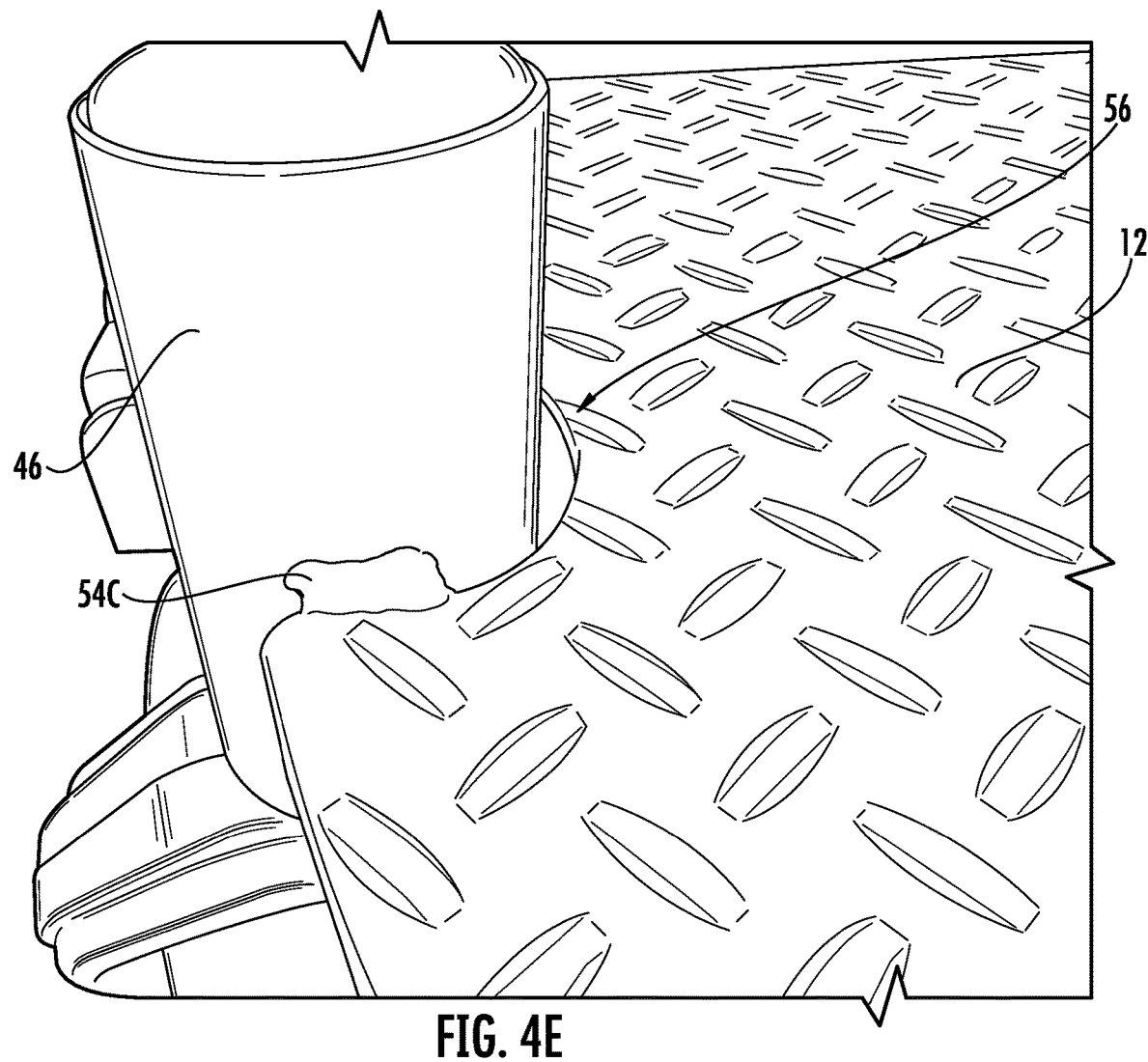

Referring to FIG. 4E, shown is one of the pivot mounts 46, representative of each of the pivot mounts 46, and further illustrates how the load deck 12 comprises an opening 56 (e.g., notch) that permits the pivot mount 46 to extend above and below a plane of the load deck 12. That is, the pivot mount 46 extends above and below the load deck 12, and in one embodiment, the load deck 12 is secured to the pivot mount 46 via a weld 54C (and in some embodiments, also welded between the load deck 12 and this pivot mount 46 on the other side that is not shown in this view). Similar weld(s) are implemented for the opposing side pivot mount 46. In some embodiments, the opening 56 may fully surround the pivot mount 46 (versus partially surrounding), such as if the pivot mounts 46 were not angled or angled as much from the longitudinal centerline of the stand-on mower 10, or if the load deck 12 was widened, or for other design reasons.

Figure 4F:
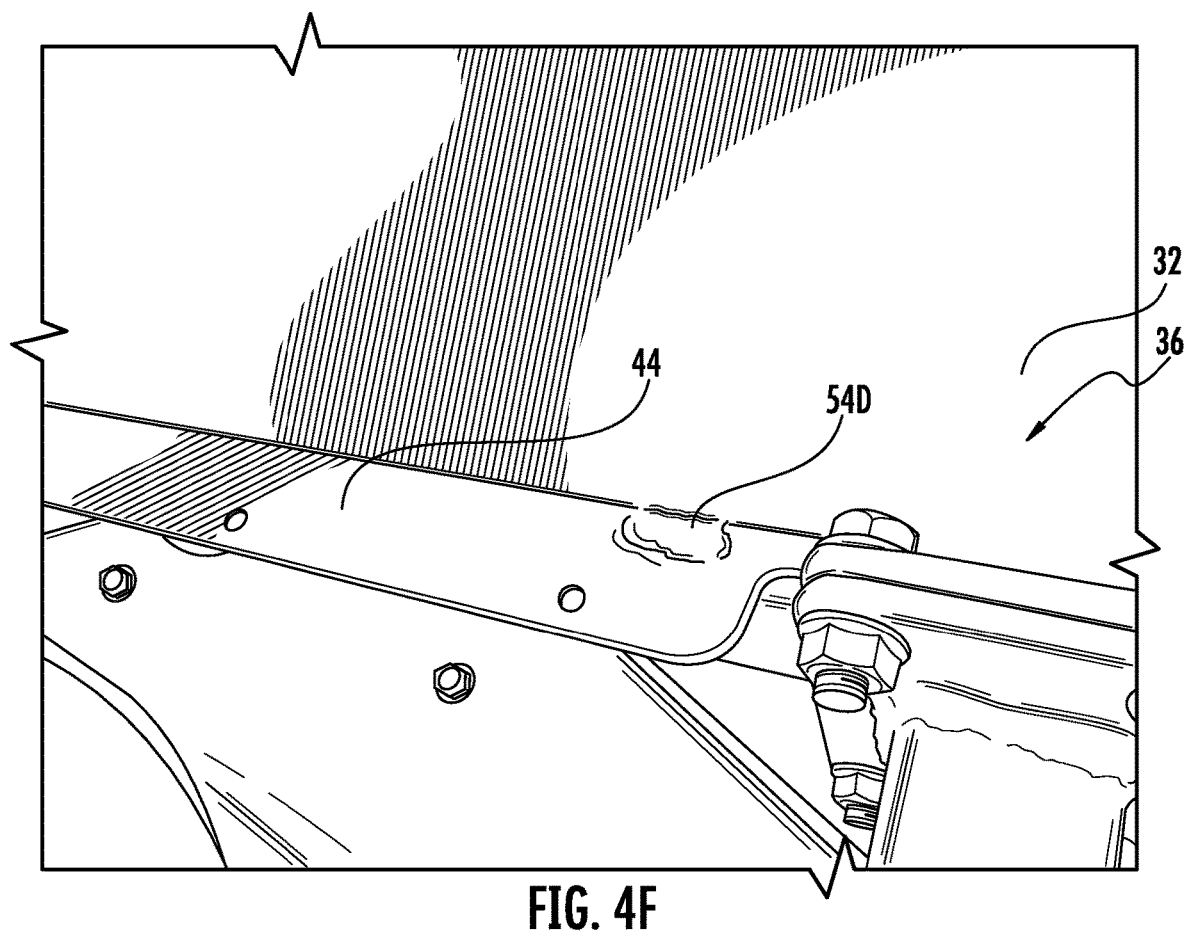

FIG. 4F is a close-up view of a lower portion of the rearward-facing surface 36 of the second (e.g., upright) portion 32 of the load deck 12. In particular, an example weld 54D is shown that secures the second portion 32 to the laterally-oriented frame member 44 of the chassis 14. It should be appreciated that additional welds may be used along the junction between the lower portion of the second portion 32 and the laterally-oriented frame member 44. In some embodiments, there may be plural welds 54D spaced apart, or in some embodiments, the weld coverage may be extended (e.g., along a greater lateral distance and/or entirely along the junction).

Figure 4G:
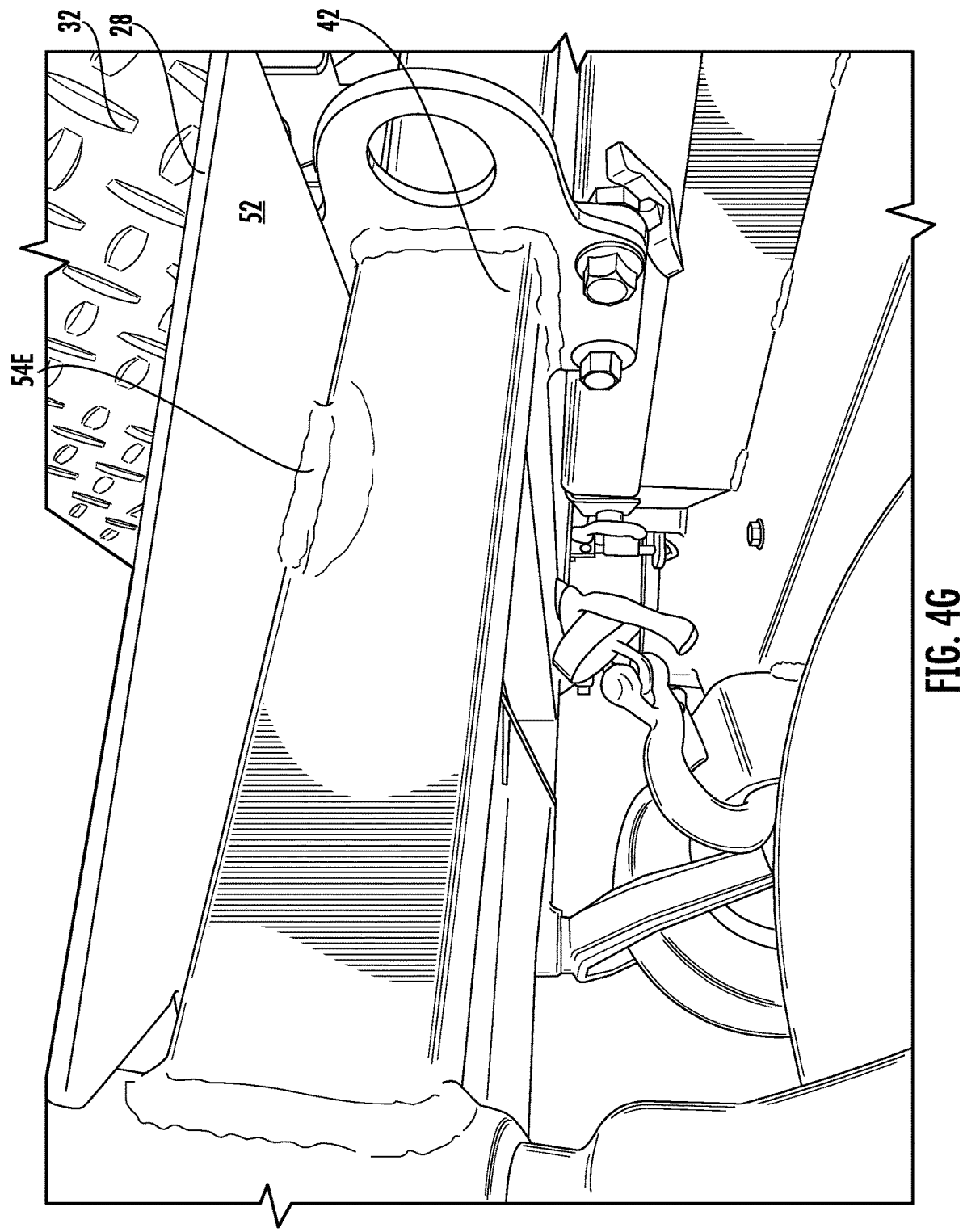

FIG. 4G is a side-perspective view that shows an example weld 54E that secures the lower surface 52 of the first portion 28 of the load deck 12 to one of the forwardly extending frame members 42 at a location proximal to the end of the load deck 12 that joins with the (e.g., upright) second portion 32. As explained similarly above, though one weld 54E is shown, it should be appreciated that additional welds 54E and/or different weld coverage areas per weld may be used in some embodiments. It should be appreciated that a similar securement is achieved between the load deck 12 and the other forwardly extending frame members 42.

Figure 5:
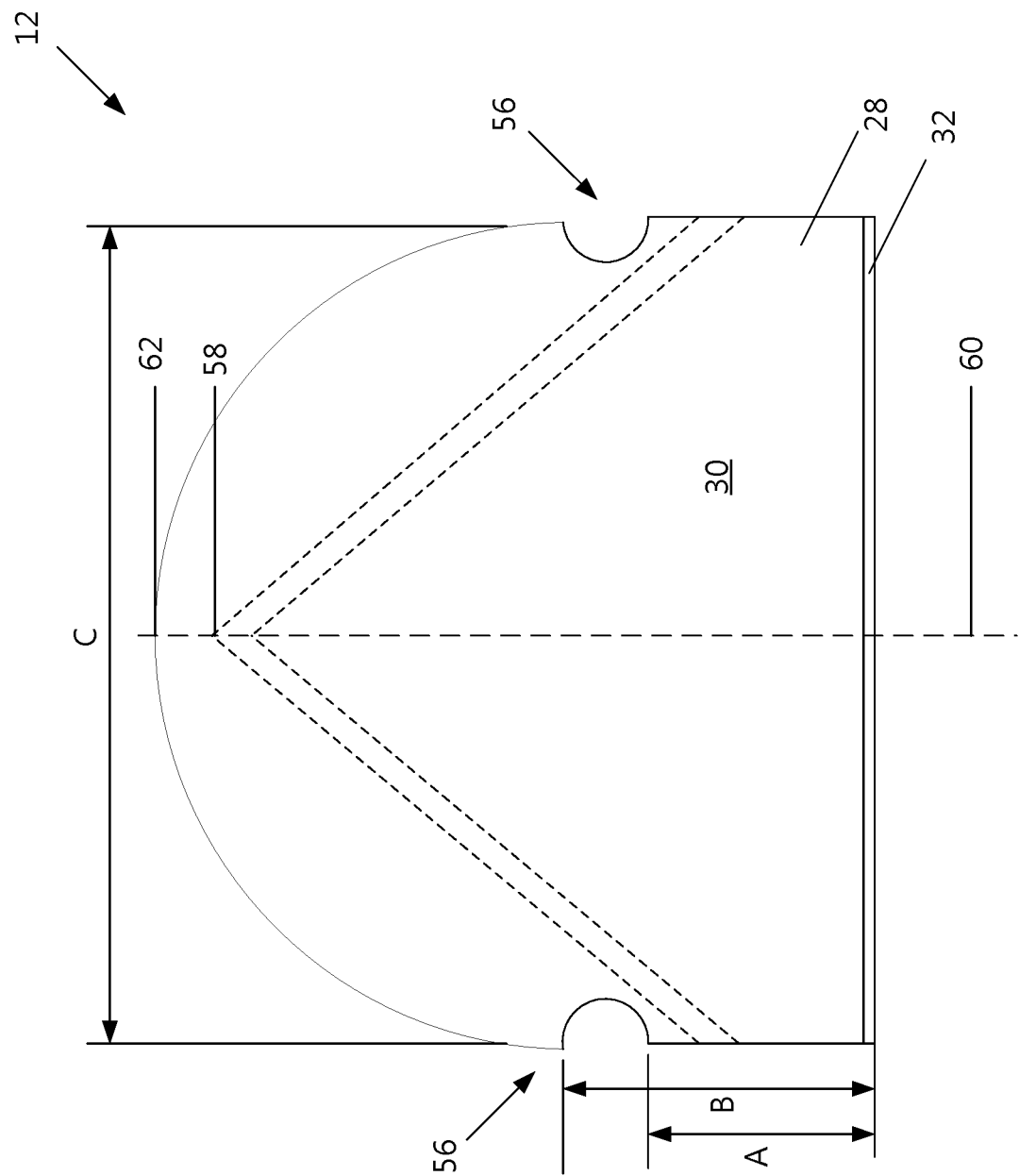
FIG. 5 is a schematic diagram that illustrates example dimensions and one example geometric shape of an embodiment of an example load deck.

Referring now to FIG. 5, shown is schematic diagram that illustrates example dimensions and geometric shape of the load deck 12. It should be appreciated that the dimensions depicted in FIG. 5 are merely illustrative of a load deck 12 for a particular manufacturer and model type of stand-on mower 10, and that in some embodiments, different dimensions/specifications may be used for the same manufacturer/model or different manufacturers/model types. The diagram depicts a top plan view, with the support members 50 (shown in phantom, dashed line) forming (at the lower surface of the load deck 12) a triangular shape that meets at an apex 58 coincident with a longitudinal line or plane 60 that runs through the apex 62 of the forward most location of the rounded end of the load deck 12. In other words, the apexes 58 and 62 are proximal to one another, and on the same longitudinal plane 60. As shown, the load deck 12 is shaped in a substantially semi-circular form, though other geometries may be used in some embodiments. The openings 56 (e.g., notch openings) permit the pivot mounts 46 (not shown in FIG. 5) to be positioned to extend above and below the load deck 12. Further, the load deck 12 clearly extends substantially beyond the pivot mounts 46, offering a generous surface area for carrying various types and dimensions of loads. In one embodiment, the dimension "A" corresponds to a distance from the rearward facing surface 36 of the second portion 32 to the rear-most location of the opening 56, and the dimension "B" corresponds to a distance from the rearward facing surface 36 of the second portion 32 to the forward-most location of the opening 56 of the second portion. In one embodiment, the dimensions are at or approximately 7 inches for "A", and at or approximately 10 inches for "B". The dimension "C" corresponds to a diameter of the semi-circular shape of the first portion 28, and in one embodiment, is at or approximately 69 inches. As to the second portion 32, in one embodiment, dimensions are at or approximately 8 inches in height, 36 inches in width (side-to-side), and ½ inch thickness. As explained above, these dimensions are merely for illustration, and other dimensions are contemplated to be within the scope of the disclosure.

In view of the above description, it should be appreciated by one having ordinary skill in the art that one embodiment of a method of installing a load deck for a stand-on mower comprises forming a load deck for a stand-on mower, the stand-on comprising a chassis having drive wheels operably coupled to the chassis, a platform arranged between the drive wheels, a front wheel frame, coupled to the chassis, and having pivot mounts and front wheels coupled to the pivot mounts, and a mower deck arranged between the front wheels and the drive wheels. For instance, forming the load deck may comprise cutting the steel from a larger flat, steel sheet into a substantially semi-circular, flat metal sheet of suitable thickness, along with openings for enabling a suitable fit with the pivot mounts. Note that the semi-circular shape is one geometric design, and that in some embodiments, the metal sheet may be formed of other geometric configurations (e.g., rectangular or other multi-sided configurations). In some embodiments, the cutting may be achieved using computer-controlled machinery or performed manually or a combination of both. The cutting may be performed using a blade (e.g., diamond blade or other metal cutting or abrasive blades for cutting steel), laser, milling machine, or other metal cutting techniques known in the art. In some embodiments, the metal plate may be cast or forged. In some embodiments, the metal plate may be patterned (e.g., with stipples or otherwise to roughen the surface(s)) on all or a portion of one side or both sides using known techniques, or in some embodiments, the raw metal material may be received as a patterned sheet. In some embodiments, patterning may be omitted.

In some embodiments where a back plate (e.g., second portion or upright plate) is used, the method further comprises forming the second portion. In one embodiment, the second portion is formed by bending the formed metal plate, resulting in the flat metal first portion and the substantially upright second portion. In some embodiments, the second portion is formed similarly to the formation of the metal plate (e.g., a first portion) and affixed (e.g., via welding, bolts, etc.) the second portion to the first portion.

In some embodiments, the first and second portions are formed at once (e.g., via a forging or cast operation).

In some embodiments, patterning may further be applied or formed during the upright plate forming operation, or omitted in some embodiments.

In some embodiments, the method further comprises affixing one or more support members to the lower surface of the load deck. In one embodiments, the support members are arranged in a triangular arrangement and welded at spaced apart locations or continuously at support member surfaces adjacent the lower surface of the metal plate (e.g., first portion). In some embodiments, a single support member may be welded to the lower surface, or in some embodiments, two or more support members may be welded to the lower surface according to any of a plurality of different geometric arrangements suitable for providing support for loads of the desired capacity placed on the load deck. In some embodiments, the support members may be attached using other affixing mechanisms (e.g., screws, bolts, etc.). In some embodiments, depending on the strength and/or thickness of the metal plate, the support members may be omitted.

The method further comprises mounting the load deck to the front wheel frame and forward of the mower deck. For instance, the load deck may be welded in spaced apart locations, or continuously, between the lower surface of the load deck and the front wheel frame, as explained above. In some embodiments, the load deck may be affixed at least in part to the front wheel frame through welds between the support members and the front wheel frame. In some embodiments, there may be additional welds between the upper surface of the load deck and the pivot mounts. Note that welds may be achieved using automated or semi-automated welding machines, or in some embodiments, performed manually or a combination of both techniques. In some embodiments, other and/or additional affixing mechanisms may be used (e.g., screws, bolts, etc.) for mounting the load deck onto the front wheel frame.

Any process descriptions described for the aforementioned method should be understood as representing steps in a process, and alternate implementations are included within the scope of the embodiments in which steps may be executed out of order from that discussed, including substantially concurrently, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A stand-on mower, comprising a chassis having drive wheels operably coupled to the chassis, a platform arranged between the drive wheels, a front wheel frame, coupled to the chassis, and having pivot mounts and front wheels coupled to the pivot mounts, a mower deck arranged between the front wheels and the drive wheels, and a load deck mounted to the front wheel frame and having openings through which the pivot mounts extend, the load deck arranged fore and aft beginning from proximal to a front end of the mower deck to beyond the pivot mounts and having an upper-facing, load bearing surface with sufficient area to enable transport of lawncare, or landscape maintenance, material.

2. The stand-on mower of claim 1, wherein the load deck comprises a first portion having the upper-facing, load bearing surface and a lower surface, wherein the pivot mounts extend above and below the first portion.

3. The stand-on mower of claim 2, further comprising one or more support members coupled to the lower surface of the load deck and to the front wheel frame, and wherein the one or more support members are secured to the lower surface of the load deck and to the front wheel frame.

4. The stand-on mower of claim 2, wherein the load deck is secured to the pivot mounts.

5. The stand-on mower of claim 2, wherein the load deck is secured to the front wheel frame.

6. The stand-on mower of claim 2, wherein the load deck further comprises a second portion that joins the first portion and that is substantially orthogonal to the first portion.

7. The stand-on mower of claim 2, wherein the first portion comprises a substantially semi-circular shape.

8. The stand-on mower of claim 1, wherein the load deck comprises a steel material having a thickness of approximately $1/16^{th}$ inch or more.

9. The stand-on mower of claim 1, wherein the upper-facing, load bearing surface comprises a rough surface.

10. The stand-on mower of claim 9, wherein the rough surface comprises a stippled surface.

11. The stand-on mower of claim 1, wherein the front wheels comprise caster wheels.

12. A method of installing a load deck for a stand-on mower, comprising:
   forming a load deck for a stand-on mower, the stand-on mower comprising a chassis having drive wheels operably coupled to the chassis, a platform arranged between the drive wheels, a front wheel frame, coupled to the chassis, and having pivot mounts and front wheels coupled to the pivot mounts, and a mower deck arranged between the front wheels and the drive wheels; and
   mounting the load deck to the front wheel frame, the load deck arranged fore and aft beginning from proximal to a front end of the mower deck to beyond the pivot mounts and having an upper-facing, load bearing surface with sufficient area to enable transport of lawncare, or landscape maintenance, material.

* * * * *